(12) United States Patent
Park et al.

(10) Patent No.: US 12,231,158 B2
(45) Date of Patent: Feb. 18, 2025

(54) ELECTRONIC DEVICE COMPRISING METAL HOUSING AND MANUFACTURING METHOD THEREFOR

(71) Applicant: Samsung Electronics Co., Ltd., Suwon-si (KR)

(72) Inventors: Jeongseok Park, Suwon-si (KR); Yiming Chen, Guangzhou (CN); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/641,004

(22) PCT Filed: May 19, 2020

(86) PCT No.: PCT/KR2020/006524
§ 371 (c)(1),
(2) Date: Mar. 7, 2022

(87) PCT Pub. No.: WO2021/045346
PCT Pub. Date: Mar. 11, 2021

(65) Prior Publication Data
US 2022/0345169 A1    Oct. 27, 2022

(30) Foreign Application Priority Data

Sep. 6, 2019  (CN) .......................... 201910851478.8

(51) Int. Cl.
*H04B 1/3888*   (2015.01)
*H04M 1/02*    (2006.01)

(52) U.S. Cl.
CPC ......... *H04B 1/3888* (2013.01); *H04M 1/0262* (2013.01); *H04M 1/0264* (2013.01); *H04M 1/0266* (2013.01)

(58) Field of Classification Search
None
See application file for complete search history.

(56) References Cited

U.S. PATENT DOCUMENTS 9,206,522 B2    12/2015   Cho et al.
10,428,762 B2   10/2019   Murakami et al.
(Continued)

FOREIGN PATENT DOCUMENTS

CN    103052290 A    4/2013
CN    104607884 A    5/2015
(Continued)

OTHER PUBLICATIONS

Chinese Office Action dated Aug. 21, 2020; Chinese Appln. No. 201910851478.8.
(Continued)

*Primary Examiner* — Frantz Bataille
(74) *Attorney, Agent, or Firm* — Jefferson IP Law, LLP

(57) ABSTRACT

According to various embodiments of the present invention, an electronic device may comprise: a housing comprising a first surface, a second surface, and a side surface surrounding the space between the first surface and the second surface; and a display provided in the space and exposed via the first surface. At least one of the first surface, the second surface, and the side surface may comprise: a metal alloy including at least one pore in the surface; a metal member occupying at least a portion of the inner space of the at least one pore; and an oxidation film which contacts the metal member and at least a portion of the metal alloy.

20 Claims, 19 Drawing Sheets

(56) References Cited

U.S. PATENT DOCUMENTS

| | | | |
|---|---|---|---|
| 2013/0093299 A1* | 4/2013 | Cho | C25D 11/246 |
| | | | 72/46 |
| 2017/0013735 A1* | 1/2017 | Choi | C23F 4/00 |
| 2018/0109657 A1 | 4/2018 | Tang et al. | |
| 2019/0159352 A1 | 5/2019 | Sun et al. | |

FOREIGN PATENT DOCUMENTS

| | | |
|---|---|---|
| CN | 105239071 A | 1/2016 |
| CN | 107164662 A | 9/2017 |
| CN | 107841776 A | 3/2018 |
| CN | 108655368 A | 10/2018 |
| CN | 109719280 A | 5/2019 |
| JP | 2015-217565 A | 12/2015 |
| KR | 10-2013-0040322 A | 4/2013 |
| KR | 10-2015-0106981 A | 9/2015 |
| KR | 10-2017-0006709 A | 1/2017 |
| KR | 10-1889370 B1 | 8/2018 |
| KR | 10-1917974 B1 | 11/2018 |
| KR | 10-2019-0022794 A | 3/2019 |

OTHER PUBLICATIONS

Chinese Office Action dated Nov. 2, 2021; Chinese Appln. No. 201910851478.8.

Chinese Notice of Allowance dated May 7, 2021; Chinese Appln. No. 201910851478.8.

\* cited by examiner

ELECTRONIC DEVICE COMPRISING METAL HOUSING AND MANUFACTURING METHOD THEREFOR

TECHNICAL FIELD

Various embodiments of the disclosure relate to an electronic device including a metal housing and a manufacturing method therefor.

BACKGROUND ART

A housing forming an exterior of an electronic device such as a smartphone is generally implemented by using metal. The metal housing may be manufactured by a computerized numerical control (CNC) technique, a press/forging technique, or a diecasting technique. The CNC technique is a method for forming a housing by cutting a metal alloy lump. In the case of the CNC technique, a long time is required to process and a relatively large amount of raw material of metal may be thrown out. The press/forging technique is a method for forming a housing by pressing a metal alloy material by using a mold fabricated according to a shape of the housing. After pressing, some CNC processes may be added. The diecasting technique is a method for forming a housing by putting a metal alloy melted at high temperature into a mold at high speed/under high pressure. The diecasting may implement a complicated shape in a mold, and may be advantageous for mass production.

DISCLOSURE OF INVENTION

Technical Problem

The diecasting technique may be used to manufacture a housing of a metallic material. In a diecasting process, it may be difficult to create a vacuum on the inside of a mold chamber, and air may be mixed when an alloy melted at high temperature is putted to the chamber. Therefore, at least one pore may be formed since air is trapped in a product. The pore may be exposed to the outside when an exterior of the product is processed, and the pore exposed to the outside may cause a defect in the exterior of the product. Since it is difficult to sort out the pore before the exterior of the product is processed, a process loss may be caused. Such a diecasting technique may cause a high defect rate (for example, about 20 to 30%), and the defect rate may increase a cost of a product.

Various embodiments of the disclosure provide a method for processing a pore generated when a housing of a metallic material is manufactured by diecasting, and an electronic device.

Solution to Problem

According to various embodiments of the disclosure, an electronic device may include: a housing including a first surface, a second surface, and a side surface surrounding a space between the first surface and the second surface; and a display positioned in the space and exposed through the first surface. At least one of the first surface, the second surface, or the side surface may include: a metal alloy including at least one pore formed on a surface; a metal member occupying at least part of an inner space of the at least one pore; and an oxidation film contacting at least part of the metal alloy and the metal member.

According to various embodiments of the disclosure, a housing may include a first surface, a second surface, and a side surface surrounding a space between the first surface and the second surface. At least one of the first surface, the second surface, or the side surface may include: a metal alloy including at least one pore formed on a surface; a metal member occupying at least part of an inner space of the at least one pore; and an oxidation film contacting at least part of the metal alloy and the metal member.

According to various embodiments, a method for manufacturing a housing for an electronic device may include: generating a metal alloy of a housing shape by using diecasting; coating a metal layer over the metal alloy; cutting the metal layer and a part of the metal alloy; and forming an oxidation film by performing anodizing.

Advantageous Effects of Invention

According to various embodiments of the disclosure, an electronic device and a manufacturing method therefor may reduce sizes of pores existing in a housing by filling at least part of an inner space of a pore of a metal alloy with a metal member, and forming an oxidation film layer.

BEST MODE FOR CARRYING OUT THE INVENTION

Hereinafter, various embodiments will be described in detail with reference to the accompanying drawings.

Figure 1:
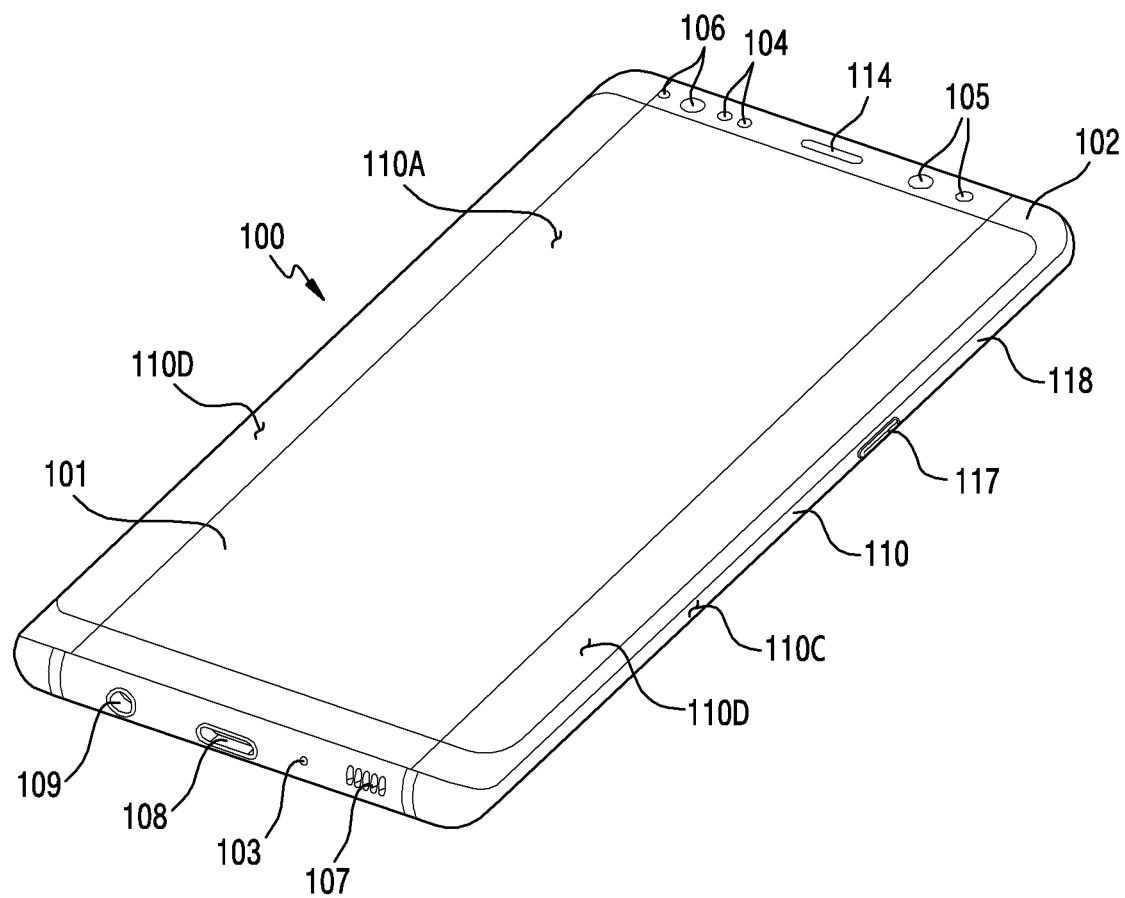
FIG. 1 is a perspective view of a front surface of a mobile electronic device according to an embodiment.
Figure 2:
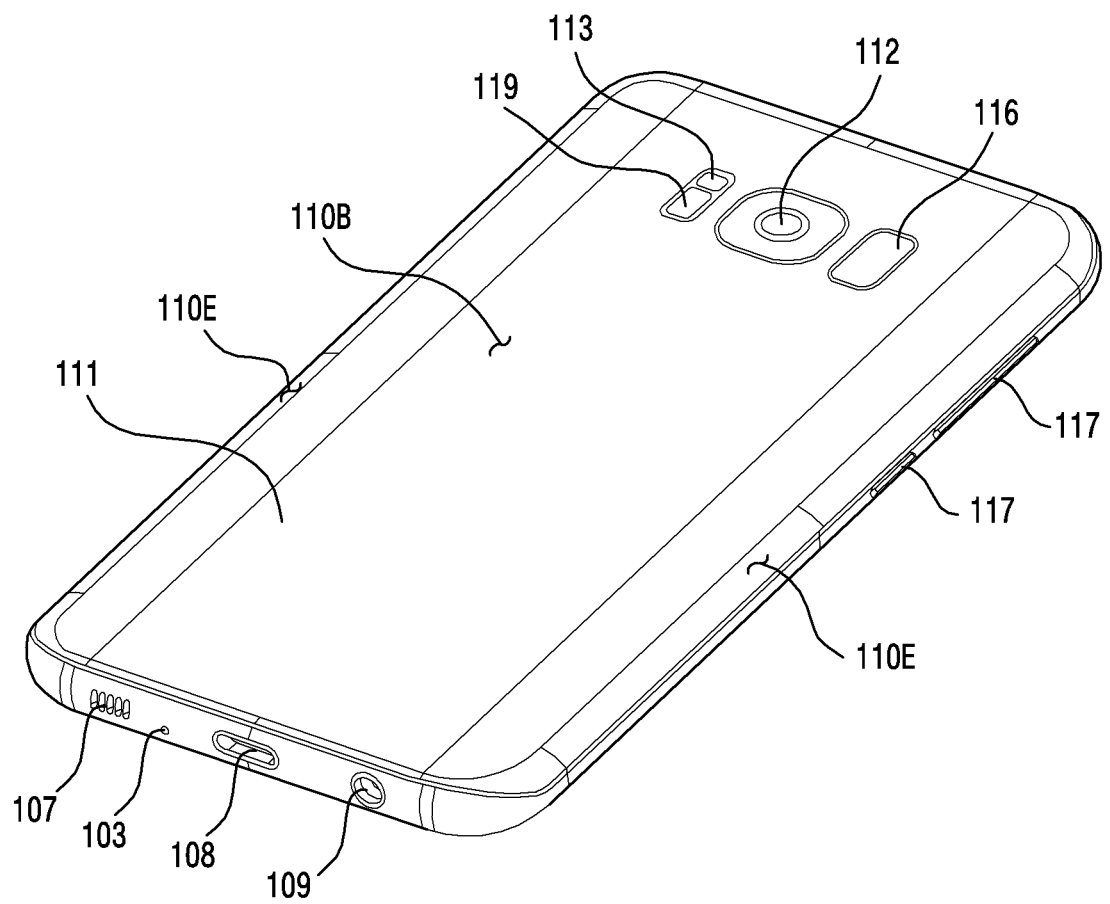
FIG. 2 is a perspective view of a rear surface of the electronic device of FIG. 1 according to an embodiment.
Figure 3:
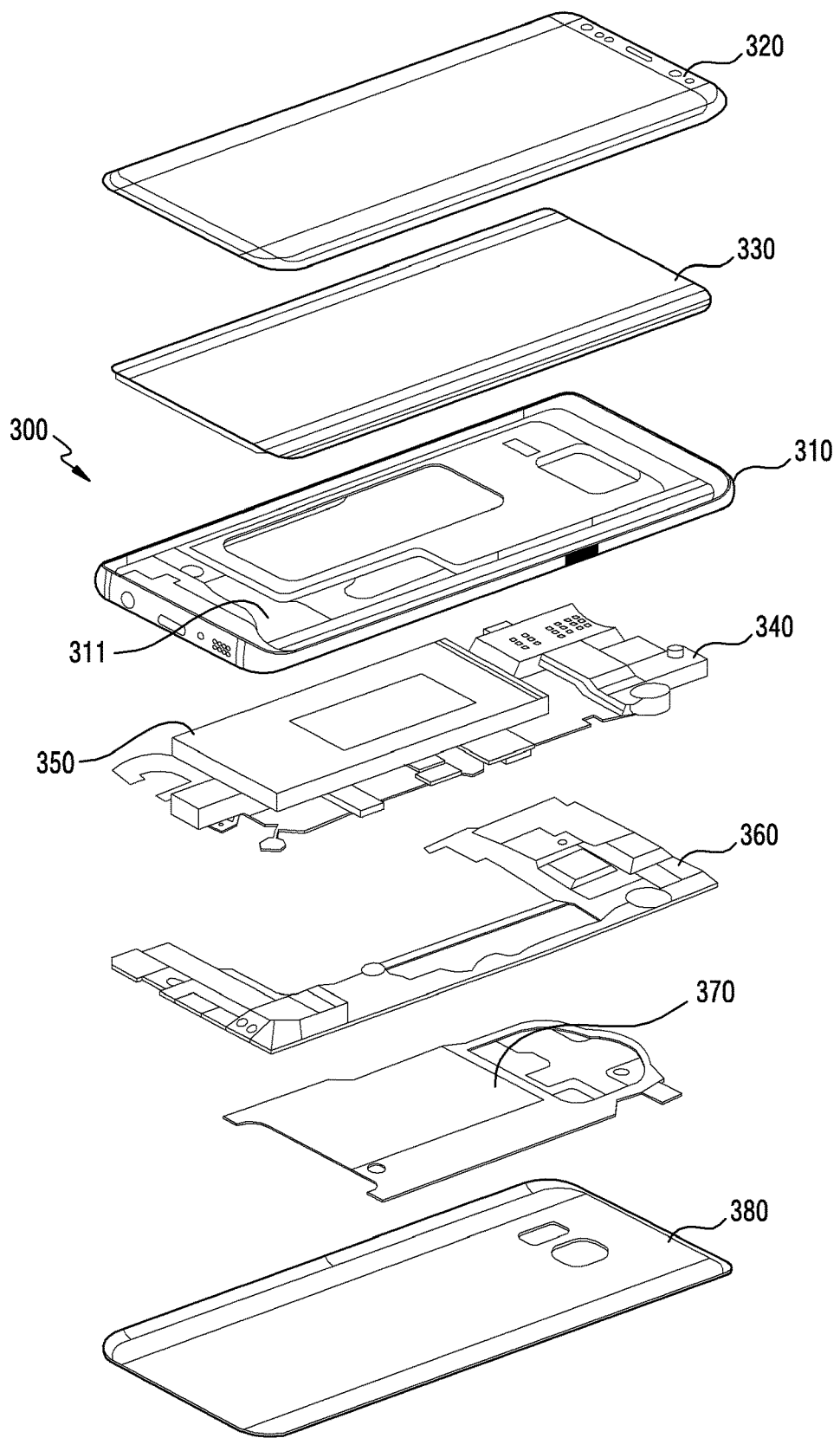
FIG. 3 is an exploded perspective of the electronic device of FIG. 1 according to an embodiment.

FIG. 1 is a perspective view of a front surface of a mobile electronic device having a housing including a metallic material according to an embodiment. FIG. 2 is a perspective view of a rear surface of the electronic device of FIG. 1. FIG. 3 is an exploded perspective view of the electronic device of FIG. 1 according to an embodiment.

Referring to FIGS. 1 and 2, the electronic device 100 according to an embodiment may include a housing 110 which includes a first surface (or a front surface) 110A, a second surface (or a rear surface) 110B, and a side surface 110C surrounding a space between the first surface 110A and the second surface 110B. In another embodiment (not shown), the housing may refer to a structure that forms a part of the first surface 110A, the second surface 110B, and the side surface 110C of FIG. 1. According to an embodiment, the first surface 110A may be formed by a front surface plate 102 having at least part substantially transparent (for example, a glass plate including various coating layers, or a polymer plate). The second surface 110B may be formed by a rear surface plate 111 which is substantially opaque. The rear surface plate 111 may be formed by, for example, coated or colored glass, ceramic, a polymer, metal (for example, aluminum, stainless steel (STS), or magnesium), or a combination of at least two of the above-mentioned materials. The side surface 110C may be formed by a side surface bezel structure (or a "side surface member") 118 which is coupled with the front surface plate 102 and the rear surface plate 111, and includes metal and/or a polymer. In a certain embodiment, the rear surface plate 111 and the side surface bezel structure 118 may be integrally formed with each other, and may include the same material (for example, a metallic material such as aluminum).

In the illustrated embodiment, the front surface plate 102 may include two first areas 110D bent from the first surface 110A toward the rear surface plate 111 and seamlessly extended, and disposed on both ends of long edges of the front surface plate 102. In the illustrated embodiment (see FIG. 2), the rear surface plate 111 may include two second areas 110E bent from the second surface 110B toward the front surface plate 102 and seamlessly extended, and disposed on both ends of long edges. In a certain embodiment, the front surface plate 102 (or the rear surface plate 111) may include only one of the first areas 110D (or the second areas 110E). In another embodiment, a part of the first areas 110D or the second areas 110E may not be included. In the above-described embodiments, when viewed from a side surface of the electronic device 100, the side surface bezel structure 118 may have a first thickness (or width) on a side surface that does not include the first areas 110D or the second areas 110E described above, and may have a second thickness thinner than the first thickness on a side surface that includes the first areas 110D or the second areas 110E.

According to an embodiment, the electronic device 100 may include at least one of a display 101, audio module 103, 107, 114, sensor modules 104, 116, 119, camera modules 105, 112, 113, a key input device 117, a light emitting element 106, and connector holes 108, 109. In a certain embodiment, the electronic device 100 may omit at least one of the components (for example, the key input device 117 or the light emitting element 106) or may additionally include other components.

The display 101 may be exposed through a substantial portion of the front surface plate 102, for example. According to a certain embodiment, at least part of the display 101 may be exposed through the front surface plate 102 forming the first surface 110A and the first areas 110D of the side surface 110C. In a certain embodiment, a corner of the display 101 may be formed substantially the same as a shape of an outside border of the front surface plate 101 adjacent thereto. In another embodiment (not shown), a gap between an outside border of the display 101 and an outside border of the front surface plate 102 may be formed substantially the same to extend an exposed area of the display 101.

In another embodiment (not shown), a recess or an opening may be formed on a part of a screen display area of the display 101, and the electronic device may include at least one of the audio module 114, the sensor module 104, the camera module 105, and the light emitting element 106 aligned with the recess or the opening. In another embodiment (not shown), the electronic device may include at least one of the audio module 114, the sensor module 104, the camera module 105, the fingerprint sensor 116, and the light emitting element 106 disposed on a rear surface of the screen display area of the display 101. In another embodiment (not shown), the display 101 may be coupled with or may be disposed adjacent to a touch sensing circuit, a pressure sensor for measuring an intensity (pressure) of a touch, and/or a digitizer for detecting a stylus pen of a magnetic field method. In a certain embodiment, at least part of the sensor modules 104, 119, and/or at least part of the key input device 117 may be disposed on the first areas 110D and/or the second areas 110E.

The audio modules 103, 107, 114 may include a microphone hole 103 and speaker holes 107, 114. The microphone hole 103 may have a microphone disposed therein to acquire an external sound, and in a certain embodiment, the microphone hole may have a plurality of microphones disposed therein to detect a direction of a sound. The speaker holes 107, 114 may include an external speaker hole 107 and a receiver hole 114 for calling. In a certain embodiment, the speaker holes 107, 114 and the microphone hole 103 may be implemented as one hole or a speaker may be included without the speaker holes 107, 114 (for example, a piezo speaker).

The sensor modules 104, 116, 119 may generate an electric signal or a data value corresponding to an internal operation state or an external environment state of the electronic device 100. The sensor modules 104, 116, 119 may include, for example, a first sensor module 104 (for example, a proximity sensor) and/or a second sensor module (not shown) (for example, a fingerprint sensor) disposed on the first surface 110A of the housing 110, and/or a third sensor module 119 (for example, an HRM sensor) and/or a fourth sensor module 116 (for example, a fingerprint sensor) disposed on the second surface 110B of the housing 110. The fingerprint sensor may be disposed not only on the first surface 110A of the housing 110 (for example, the display 101), but also on the second surface 110B. The electronic device 100 may further include a sensor module (not shown), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, 113 may include a first camera device 105 disposed on the first surface 110A of the electronic device 100, a second camera device 112 disposed on the second surface 110B, and/or a flash 113. The camera devices 105, 112 may include one or a plurality of lenses, an image sensor, and/or an image signal processor. The flash 113 may include, for example, a light emitting diode or a xenon lamp. In a certain embodiment, two or more lenses (an infrared camera, a wide-angle lens and a telephoto lens), or image sensors may be disposed on one surface of the electronic device 100.

The key input device 117 may be disposed on the side surface 110C of the housing 110. In another embodiment, the electronic device 100 may not include a part or an entirety of the key input device 117 mentioned above, and the key input device 117 that is not included may be implemented on the display 101 in other forms such as a soft key. In a certain embodiment, the key input device may include the sensor module 116 disposed on the second surface 110B of the housing 110.

The light emitting element 106 may be disposed on the first surface 110A of the housing 110, for example. For example, the light emitting element 106 may provide state information of the electronic device 100 in the form of light. In another embodiment, the light emitting element 106 may provide a light source interlocking with an operation of the camera module 105. The light emitting element 106 may include, for example, a light emitting diode (LED), an infrared LED (IR LED), and a xenon lamp.

The connector holes 108, 109 may include a first connector hole 108 to accommodate a connector (for example, a USB connector) for exchanging power and/or data with an external electronic device, and/or a second connector hole (for example, an earphone jack) 109 to accommodate a connector for exchanging an audio signal with an external electronic device.

Referring to FIG. 3, the electronic device 300 may include a side surface bezel structure 310, a first support member 311 (for example, a bracket), a front surface plate 320, a display 330, a printed circuit board 340, a battery 350, a second support member 360 (for example a rear case), an antenna 370, and a rear surface plate 380. In a certain embodiment, the electronic device 300 may omit at least one (for example, the first support member 311 or the second support member 360) of the components, or may additionally include other components. At least one of the components of the electronic device 300 may be the same as or similar to at least one of the components of the electronic device 100 of FIG. 1 or 2, and a redundant explanation thereof is omitted.

The first support member 311 may be disposed inside the electronic device 300 to be connected with the side surface bezel structure 310, or may be integrally formed with the side surface bezel structure 310. For example, the first support member 311 may be formed with a metallic material and/or a nonmetallic material (for example, polymer). The first support member 311 may have one surface coupled with the display 330 and the other surface coupled with the printed circuit board 340. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect the electronic device 300 with an external electronic device, and may include a USB connector, an SD card/multimedia connect (MMC) connector, or an audio connector.

The battery 350 may be a device that supplies power to at least one component of the electronic device 300, and may include, for example, a primary battery which is not rechargeable or a secondary battery which is rechargeable, or a fuel cell. At least part of the battery 350 may be disposed substantially on the same plane as the printed circuit board 340, for example. The battery 350 may be integrally disposed inside the electronic device 300, or may be attachably and detachably disposed in the electronic device 300.

The antenna 370 may be disposed between the rear surface plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or may wirelessly transmit and receive power necessary for charging. In another embodiment, an antenna structure may be formed by a part of the side surface bezel structure 310 and/or the first support member 311, or a combination thereof.

Figure 4:
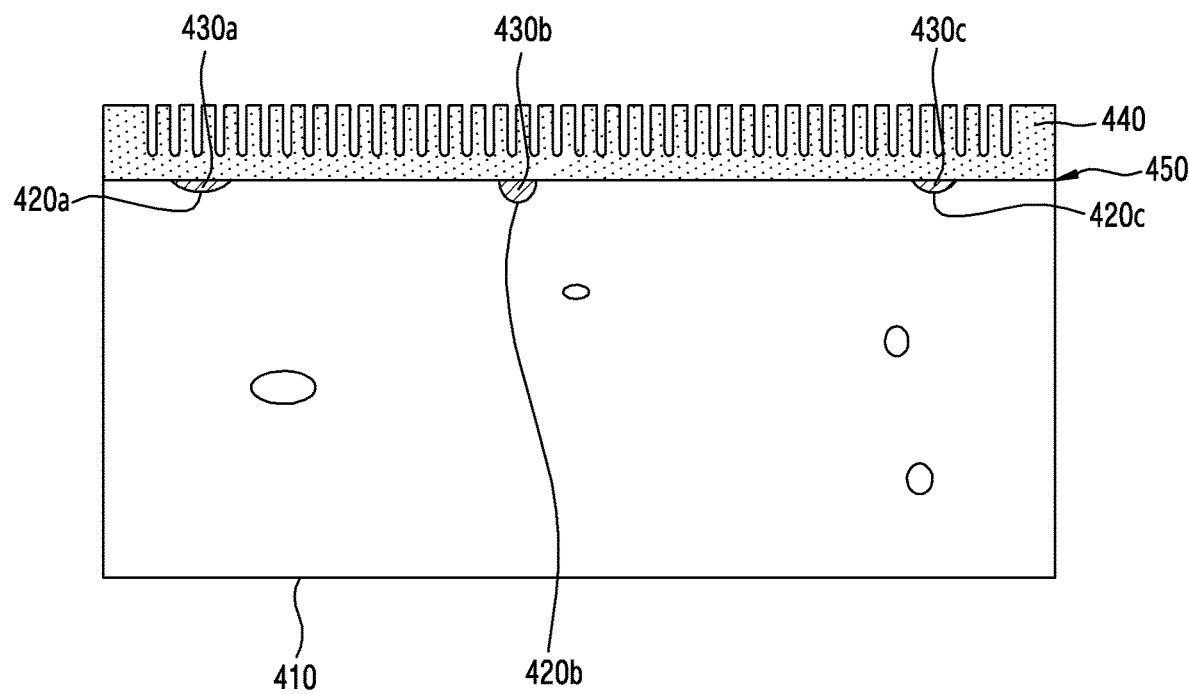
FIG. 4 is a cross-sectional view of a housing of an electronic device according to an embodiment.

FIG. 4 is a cross-sectional view of a housing (for example, the housing 110 of FIG. 1) of an electronic device according to an embodiment. FIG. 4 illustrates a housing manufactured by a diecasting technique.

Referring to FIG. 4, the housing may include a main metal alloy 410, coating members 430a, 430b, 430c, and/or an oxidation film layer 440.

The metal alloy 410 is an aluminum (Al) alloy, and may have a silicon (Si) content of 1% to 20%. Pores 420 may exist in the metal alloy 410, and some 420a, 420b, 420c of the pores 420 may exist on a surface of the metal alloy 410. FIG. 4 illustrates a state where three pores 420a, 420b, 420c exist on the surface, but two or less or four or more pores may exist on the surface.

The coating members 430a, 430b, 430c may be formed by metal which reacts with the metal alloy 410 and generates an oxidation film. For example, the coating members 430a, 430b, 430c may be formed by aluminum. The coating members 430a, 430b, 430c may exist not on the entirety of the surface of the metal alloy 410, but on a part of the surface of the metal alloy 410. For example, the coating members 430a, 430b, 430c may be positioned inside the pores 420a, 420b, 420c. At least part of inner spaces of the pores 420a, 420b, 420c may be occupied by the coating members 430a, 430b, 430c. The coating members 430a, 430b, 430c may be formed by coating an aluminum layer over the metal alloy 410 and removing the coated aluminum layer or removing parts of the coated aluminum layer and the metal alloy 410. For example, the aluminum layer may be formed by vapor deposition or plating, and may be removed.

In the example of FIG. 4, the coating members 430a, 430b, 430c may occupy the entirety of the inner spaces of the pores 420a, 420b, 420c, but according to another embodiment, the coating members 430a, 430b, 430c may occupy only parts of the inner spaces of the pores 420a, 420b, 420c. Since the coating members 430a, 430b, 430c occupy at least parts of the pores 420a, 420b, 420c, the coating member may be referred to as a 'coating filler' or other terms having the same technical meaning as the coating filler.

The oxidation film layer 440 may be formed to contact the surface of the metal alloy 410. Since the coating members 430a, 430b, 430c exist on a part of the surface of the metal alloy 410, the oxidation film layer 440 may not contact the entirety of the surface of the metal alloy 410, and may contact the metal alloy 410 on the remaining parts where the coating members 430a, 430b, 430c do not exist.

As described above with reference to FIG. 4, a part of the surface of the metal alloy 410 and at least part of the surfaces of the coating members 430a, 430b, 430c may be coplanar on a specific surface 450. On the corresponding surface 450, the oxidation film layer 440 may contact the metal alloy 410 and the coating members 430a, 430b, 430c. Since a part of the oxidation film layer 440 directly contacts the metal alloy 410, fixation of the oxidation film layer 440 in the housing may be strengthened.

The housing of the electronic device according to embodiments of the present disclosure may be configured as described above with reference to FIG. 4. The housing having the cross-sectional structure as shown in FIG. 4 may be manufactured by various processes, and the structure proposed in the disclosure is not limited in any process.

Hereinafter, an example for manufacturing the housing having the cross-sectional structure as shown in FIG. 4 will be described. However, the structure of the housing proposed in the disclosure is not limited to processes which will be described below.

Figure 5:
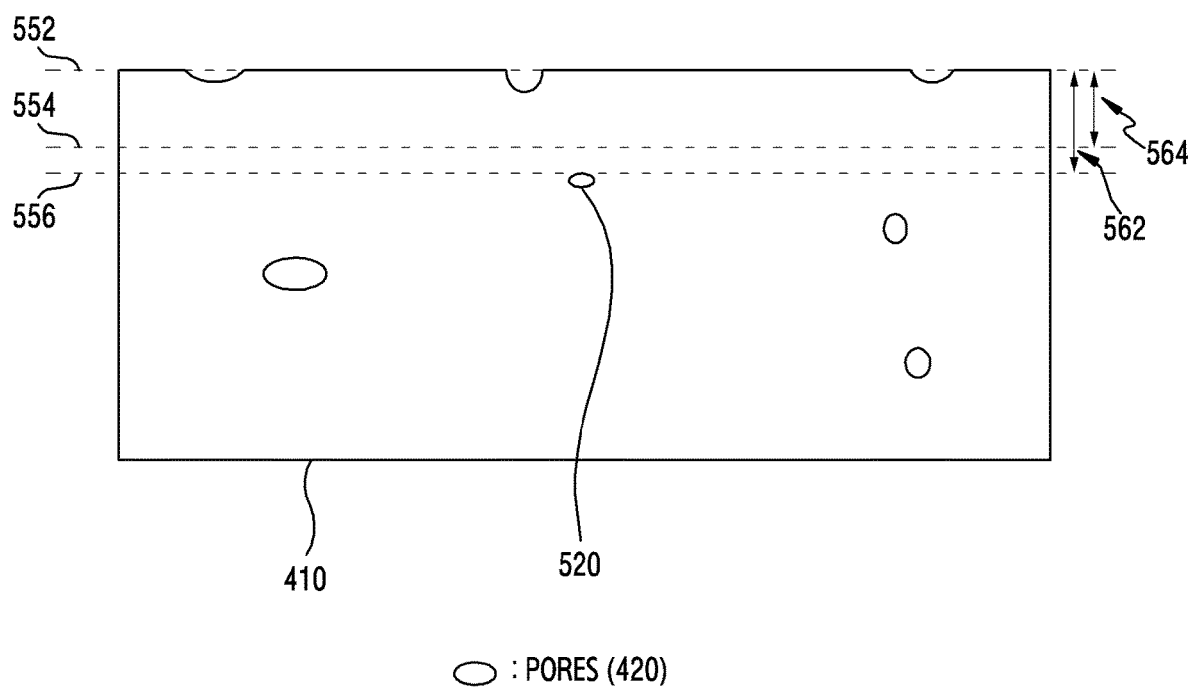
FIG. 5 is a cross-sectional view of a housing formed through diecasting according to an embodiment.

FIG. 5 is a cross-sectional view of a housing which is formed through diecasting according to an embodiment. Referring to FIG. 5, a metal alloy 410 processed by diecasting may include a plurality of pores 420. Some of the pores 420 may exist on the surface of the metal alloy 410, and the rest may exist inside the metal alloy 410. The pore existing on the surface may be referred to as a 'surface pore', and the pore existing inside may be referred to as an 'internal pore'.

There may exist an area 562 in which the internal pore does not exist from an uppermost surface 552 of the metal alloy 410 to a predetermined depth, for example, to a first internal surface 556. Since there is no internal pore in the area 562, the metal alloy may be utilized to form the structure as shown in FIG. 4. For example, when the surface of the metal alloy 410 is cut to a depth not to exceed the area 562, a depth of at least one surface pore may be reduced or at least one surface pore may be removed.

The area 562 may be understood as one layer where there does not exist an internal pore. The layer where there does not exist the internal pore may be referred to as a 'skin layer,' a 'non-pore layer,' a 'cuttable layer,' or other terms having the same technical meaning as the aforementioned terms. According to an embodiment, the skin layer may be defined as an area 564 from the uppermost surface 552 to a second internal surface 554, with a predetermined margin being formed from the first internal surface 556 which is positioned at the maximum depth to which the uppermost surface 552 is cuttable without exposing an uppermost internal pore 520. A thickness of the margin may be variously defined according to a purpose and/or an intention of a practitioner. For example, the thickness or the margin may be 0 or more.

The structure as shown in FIG. 4 may be formed by using the skin layer explained above with reference to FIG. 5 through the following actions.

Figure 6:
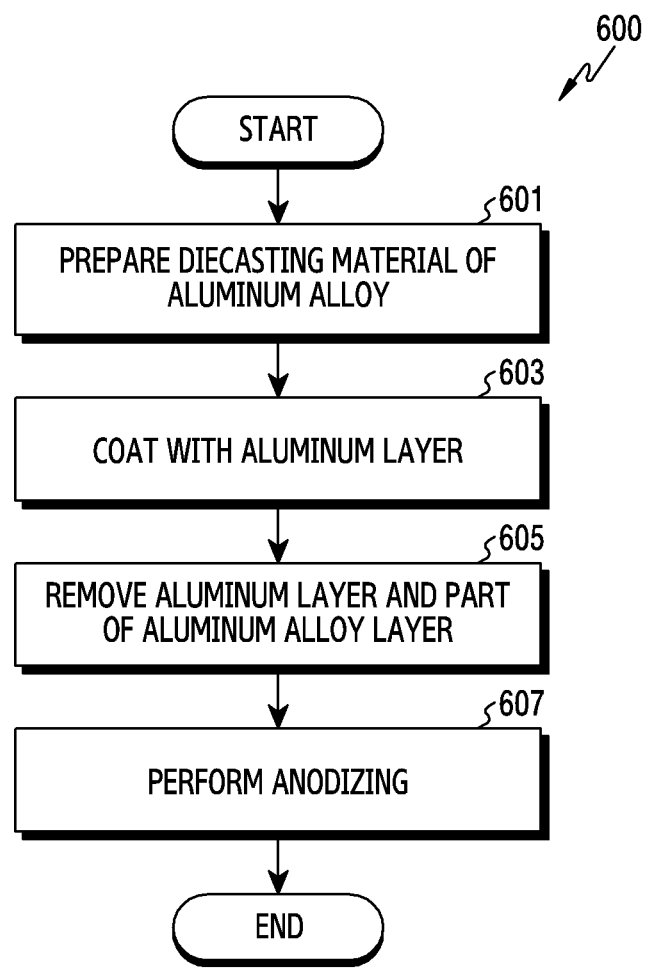
FIG. 6 is a flowchart for manufacturing a housing according to an embodiment.
Figure 7A:
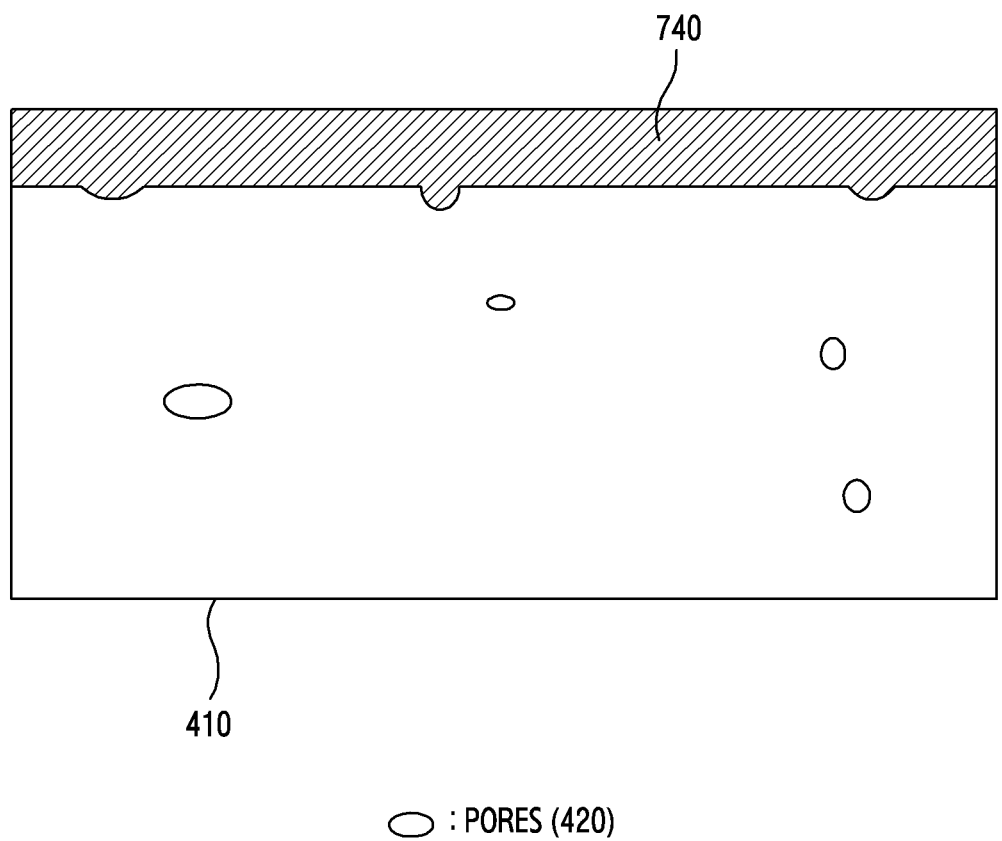
FIG. 7A is a cross-sectional view of a housing to which a coating layer is added according to an embodiment.
Figure 7B:
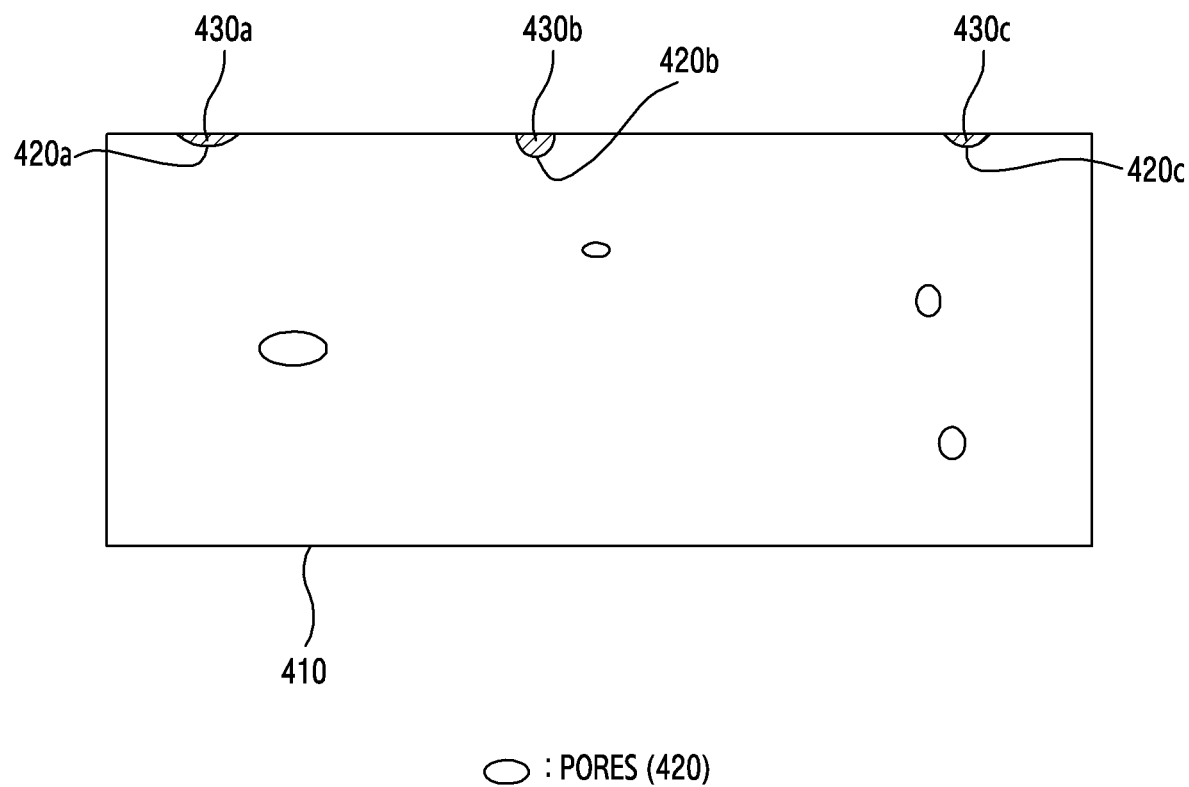
FIG. 7B is a cross-sectional view of the housing which has undergone a cutting process on the coating layer according to an embodiment.
Figure 7C:
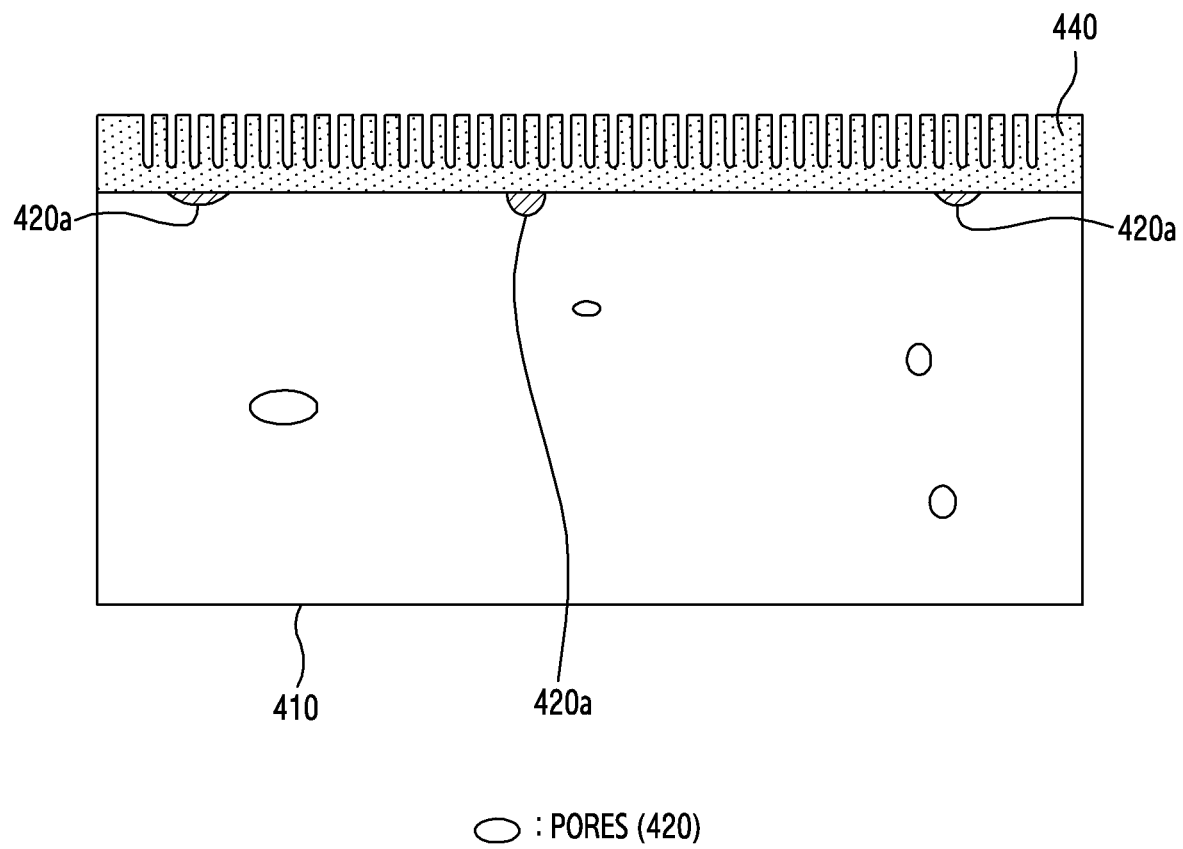
FIG. 7C is a cross-sectional view of the housing which has undergone an anodizing process according to an embodiment.

FIG. 6 is a flowchart 600 for manufacturing a housing according to an embodiment. FIG. 7A is a cross-sectional view of a housing to which a coating layer is added according to an embodiment. FIG. 7B is a cross-sectional view of the housing which has undergone a cutting process on the coating layer according to an embodiment. FIG. 7C is a cross-sectional view of the housing which has gone an anodizing process according to an embodiment. Actions illustrated in FIG. 6 are performed by an apparatus for manufacturing a housing, and the apparatus may include various power devices, control devices, and/or motion devices.

Referring to FIG. 6, in action 610, a diecasting material of an aluminum alloy may be prepared. The diecasting material is a housing formed through diecasting, and may be formed by an aluminum alloy having a silicon content of 1% to 20%. The diecasting material may include at least one pore and may include a skin layer. For example, about 95% of the pores may have a diameter of about 0.1 mm or less.

In action 603, an aluminum layer may be coated. The aluminum layer may be coated over the metal alloy which is the diecasting material. For example, the aluminum layer may be coated by physical vapor deposition (PVD) or plating. The coated aluminum layer may be referred to as a 'coating layer.' For example, as shown in FIG. 7A, an aluminum layer 740 may be attached onto a surface of a metal alloy 410. The aluminum layer 740 may occupy an internal space of at least one pore existing on the surface of the metal alloy 410. A thickness of the aluminum layer may be arbitrarily adjusted. According to an embodiment, the aluminum layer 740 which has a thickness of tens or hundreds of μm may be used to enhance adhesion of an oxidation film layer which is added by anodizing, and to cover at least part of the pore after processing.

In action 605, the aluminum layer and a part of the aluminum alloy may be removed. According to an embodiment, the aluminum layer to the surface of the aluminum alloy (for example, the metal alloy 410) may be cut and a part of the aluminum alloy may further be cut. Since the aluminum layer is cut, only a part of the aluminum layer that occupies a surface pore remains and a part of the remaining aluminum layer may be a coating member (for example, the coating members 430a, 430b, 430b, 430c). A part of the aluminum alloy may be cut in a range without exceeding the skin layer. For example, as shown in FIG. 7B, the aluminum layer except for the parts that occupy the insides of the surface pores 420a, 420b, 420c may be cut, and the metal alloy 410 may be cut to a predetermined depth from the surface. The metal alloy 410 may be cut to a predetermined depth from the surface, such that the internal spaces of the surface pores 420a, 420b, 420c may become narrow, and may become narrower due to the remaining aluminum members 430a, 430b, 430c.

In action 607, anodizing may be performed. In order to prevent corrosion and to form an aesthetical exterior, soft anodizing may be performed. By cutting in action 605, a part of the surface where anodizing is performed may be occupied by the aluminum alloy, and the other part may be occupied by the aluminum layer. For example, as shown in FIG. 7C, an oxidation film layer 440 may be formed on the surface of the metal alloy 410 by anodizing.

According to the embodiment described with reference to FIG. 6, after the aluminum layer 740 is coated over the metal alloy 410, the aluminum layer may be removed again. If anodizing (for example, action 607) is performed without a process (for example, action 605) of removing the aluminum layer 740, the aluminum layer 740 may exist between the oxidation film layer 440, which is formed by anodizing, and the metal alloy 410. When the aluminum layer 740 exists between the oxidation film layer 440 and the metal alloy 410, adhesion of the oxidation film layer 440 may be relatively lower than that when the oxidation film layer 440 is directly formed on the metal alloy 410 without the aluminum layer 740. Therefore, a part of the coated aluminum layer 740 may be removed in action 605 to make the raw material of the metal alloy 410 come into contact with the oxidation film layer 440.

Figure 8:
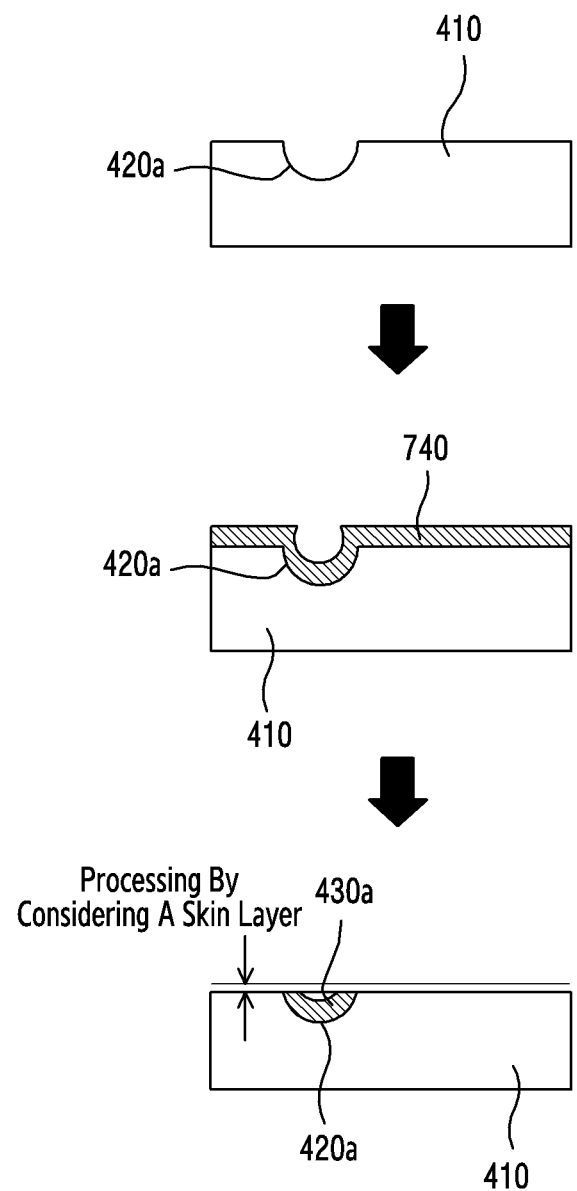
FIG. 8 is a view illustrating examples of surface treatment processes on a housing according to an embodiment.

FIG. 8 illustrates examples of surface treatment processes on the housing according to an embodiment. Referring to FIG. 8, a surface pore 420a may exist on a metal alloy 410. After an aluminum layer 740 is coated to occupy at least part of an internal space of the surface pore 420a, a part of the aluminum layer 740 is cut, such that a coating member 430a is formed. The aluminum layer 740 may be cut by considering a thickness of a skin layer.

Referring to the example shown in FIG. 8, the coating member 430*a* may exist on a part of the inside of the surface pore 420*a*, which is different from the examples of FIG. 4, FIG. 7A or 7B. When the size of the surface pore 420*a* is larger than a size that is filled by the aluminum layer 740, there still exists a spare space inside the surface pore 420*a*. Even when there still exists the spare space inside the surface pore 420*a*, the spare space is relatively smaller than the space before the aluminum layer 740 is coated, and influence on an exterior may be reduced.

According to various embodiments of the disclosure, an electronic device (for example, the electronic device 100) may include: a housing (for example, the housing 110) including a first surface (for example, the first surface 110A), a second surface (for example, the second surface 110B), and a side surface surrounding a space between the first surface and the second surface; and a display (for example, the display 101) positioned in the space and exposed through the first surface. At least one of the first surface, the second surface, or the side surface may include: a metal alloy (for example, the metal alloy 410) including at least one pore formed on a surface thereof; a metal member (for example, the coating members 430*a*, 430*b*, 430*c*) occupying at least part of an inner space of the at least one pore; and an oxidation film (for example, the oxidation film layer 440) contacting at least part of the metal alloy and the metal member.

According to various embodiments of the disclosure, the metal alloy (for example, the metal alloy 410) may include an aluminum alloy. The aluminum alloy may have a silicon (Si) content of 1% to 20%. The metal alloy may be formed by diecasting.

According to various embodiments of the disclosure, the metal member (for example, the coating members 430*a*, 430*b*, 430*c*) may be formed by aluminum. The metal member may be formed by coating an aluminum layer over the surface of the metal alloy (for example, the metal alloy 410) and then removing the aluminum layer and a part of the metal alloy. The oxidation film may be formed by soft anodizing.

According to various embodiments of the disclosure, a housing (for example, the housing 110) of an electronic device (for example, the electronic device 100) may include a first surface (for example, the first surface 110A), a second surface (for example, the second surface 110B), and a side surface surrounding a space between the first surface and the second surface, and at least one of the first surface, the second surface, or the side surface may include: a metal alloy (for example, the metal alloy 410) including at least one pore formed on a surface; a metal member (for example, the coating members 430*a*, 430*b*, 430*c*) occupying at least part of an inner space of the at least one pore; and an oxidation film contacting at least part of the metal alloy and the metal member.

According to various embodiments of the disclosure, the metal alloy (for example, the metal alloy 410) may include an aluminum alloy. The aluminum alloy may have a silicon (Si) content of 1% to 20%. The metal alloy may be formed by diecasting.

According to various embodiments of the disclosure, the metal member (for example, the coating members 430*a*, 430*b*, 430*c*) may be formed by aluminum. The metal member may be formed by coating an aluminum layer over the surface of the metal alloy (for example, the metal alloy 410) and then removing the aluminum layer and a part of the metal alloy. The oxidation film may be formed by soft anodizing.

Figure 9:
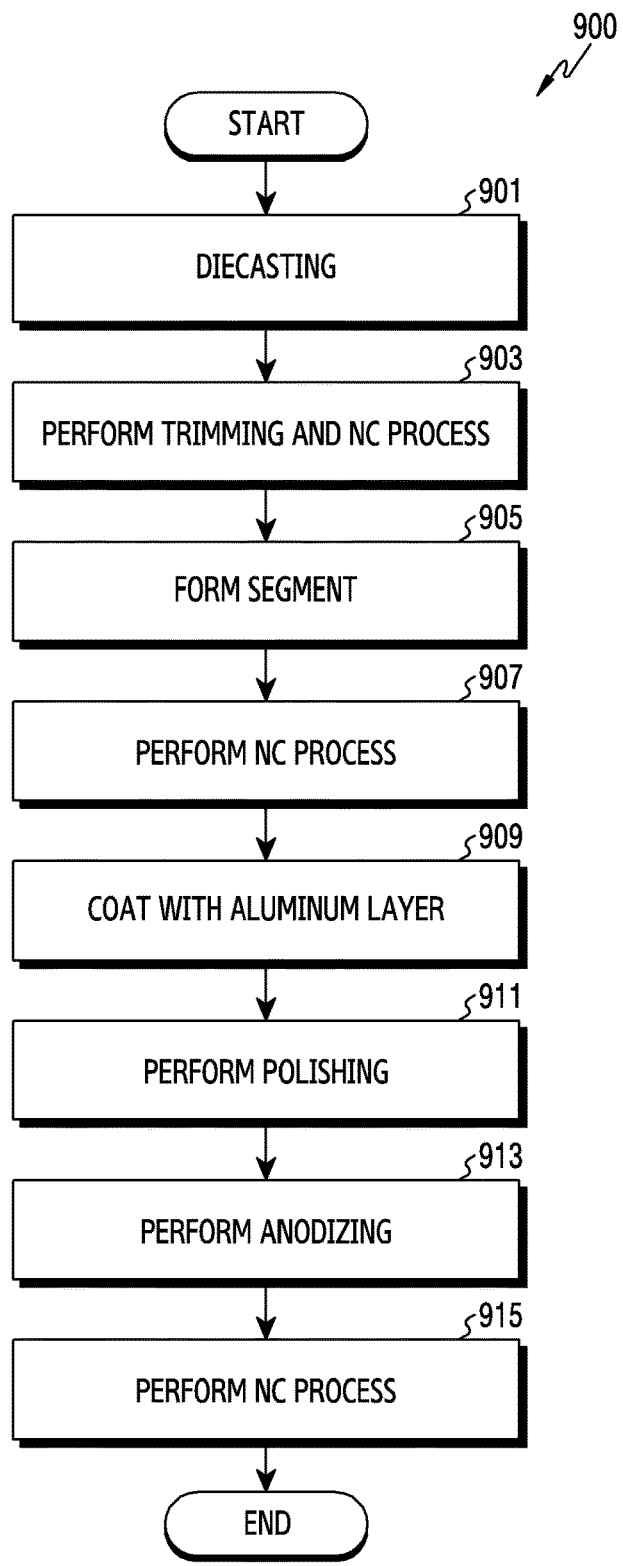
FIG. 9 is another flowchart for manufacturing a housing according to an embodiment.

FIG. 9 is another flowchart 900 for manufacturing a housing according to an embodiment. FIGS. 10A to 10F are views illustrating states of a material in processes for manufacturing the housing according to an embodiment. Actions illustrated in FIG. 9 are performed by an apparatus for manufacturing a housing, and the apparatus may include various power devices, control devices, and/or motion devices.

Figure 10A:
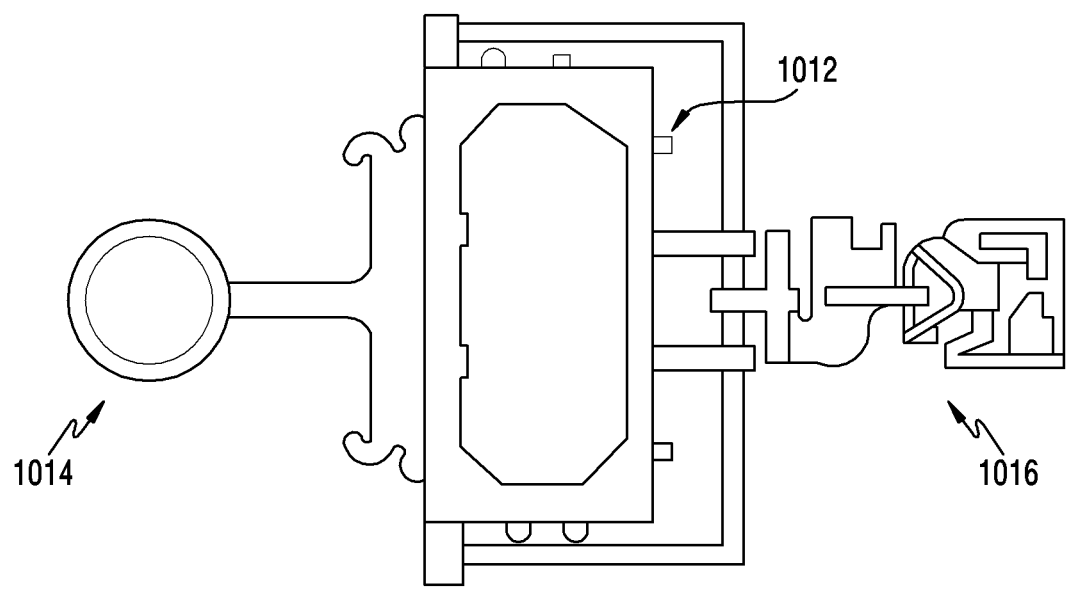
FIGS. 10A to 10F are views illustrating a state of a material in processes for manufacturing a housing according to an embodiment.

Referring to FIG. 9, in action 901, a diecasting process may be performed. A diecasting material may be formed by using a diecasting mold and a diecasting process. The diecasting material may include a metal alloy having a shape of the housing and other members which are formed during the diecasting process. For example, as shown in FIG. 10A, the material formed through diecasting may include a portion 1012 to be used as a housing, and may include a runner, a gate 1014, and/or a gas vent 1017. The gate 1014 may be a structure that is formed in a process of injecting a melted metal alloy into the mold, and the gas vent 1016 may be a structure for discharging gas generated in the process of injecting the melted metal alloy into the mold.

Figure 10B:
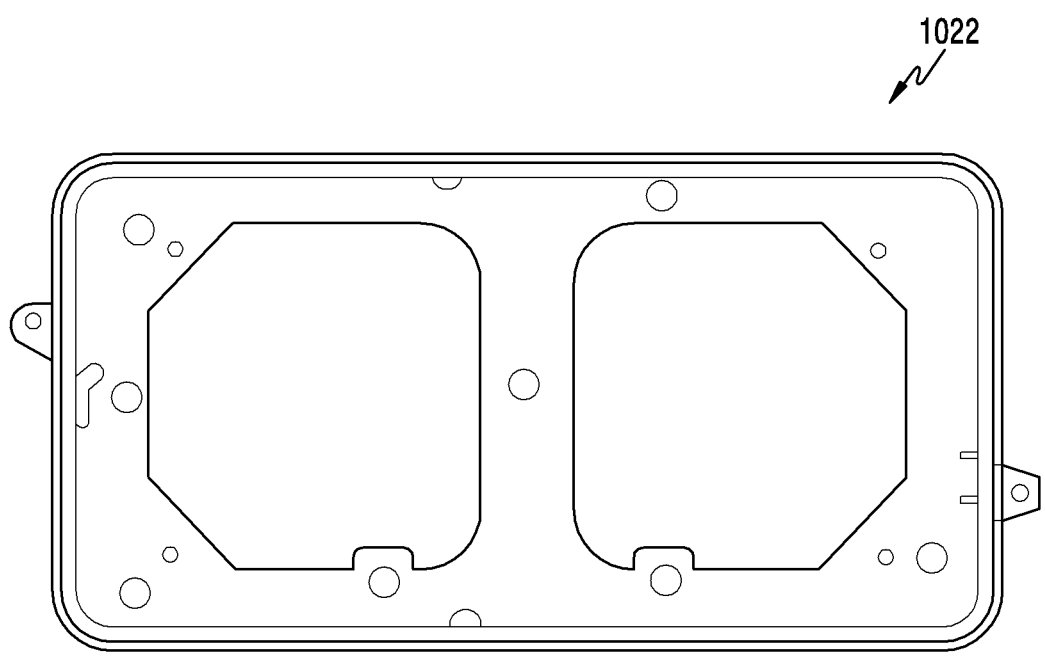
Figure 10C:
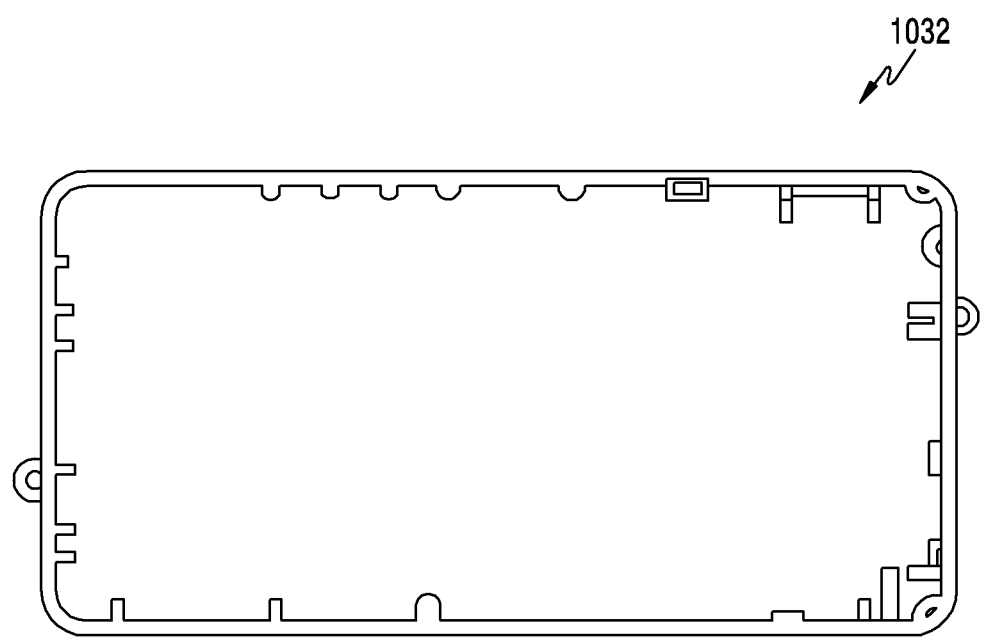

In action 903, a trimming and numerical control (NC) process may be performed. In the trimming and/or NC process, the other members (for example, the gate 1014 and/or the gas vent 1016) except for a portion that is used for the housing in the diecasting material formed in action 901 may be removed. An additional process may be performed on the diecasting member by the trimming and/or NC process. For example, shapes (for example, a hole and/or a component mounting surface) necessary for using as a housing may be formed. For example, a diecasting material 1022 as shown in FIG. 10B and/or a diecasting material 1032 as shown in FIG. 10C may be formed by the trimming and/or NC process.

Figure 10D:
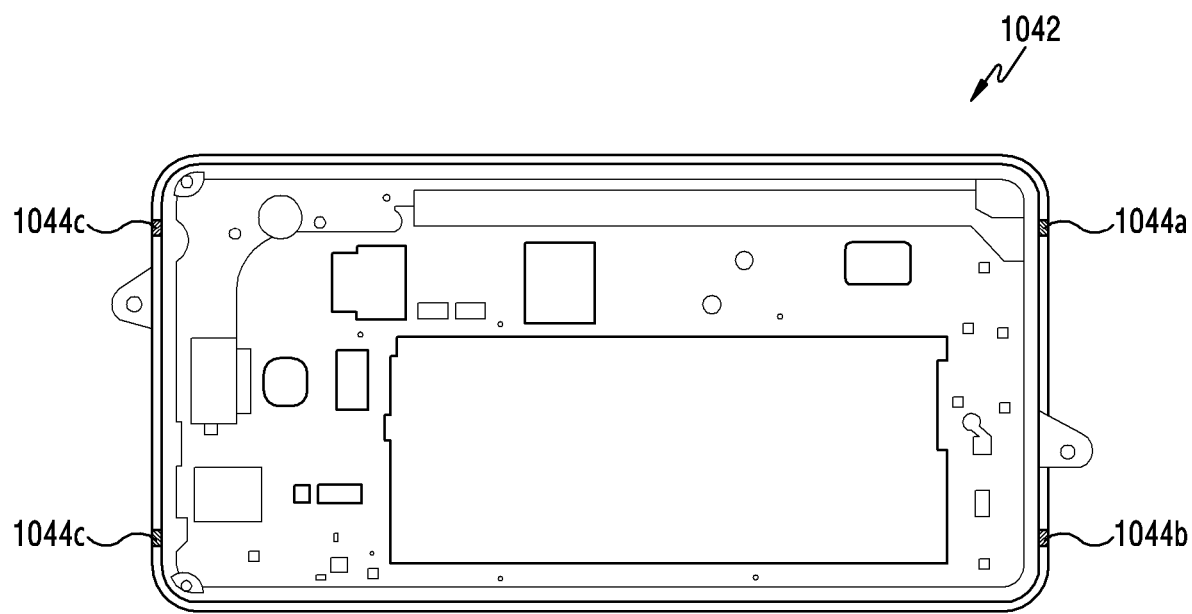

In action 905, a segment may be formed. The segment may be a member for electrically separating a part of the housing used as an antenna from the other part. For example, as shown in FIG. 10D, four segments 1044*a* to 1044*d* may be formed on a diecasting material 1042. The segment may be formed by filling a corresponding space with a nonconductive material through an insert injection process. Before the nonconductive material is filled, a chromate treatment may be performed to enhance adhesion of the nonconductive material. By the chromate treatment, a contact area between the nonconductive material and the diecasting material may be enlarged, and accordingly, adhesion may be enhanced.

Figure 10E:
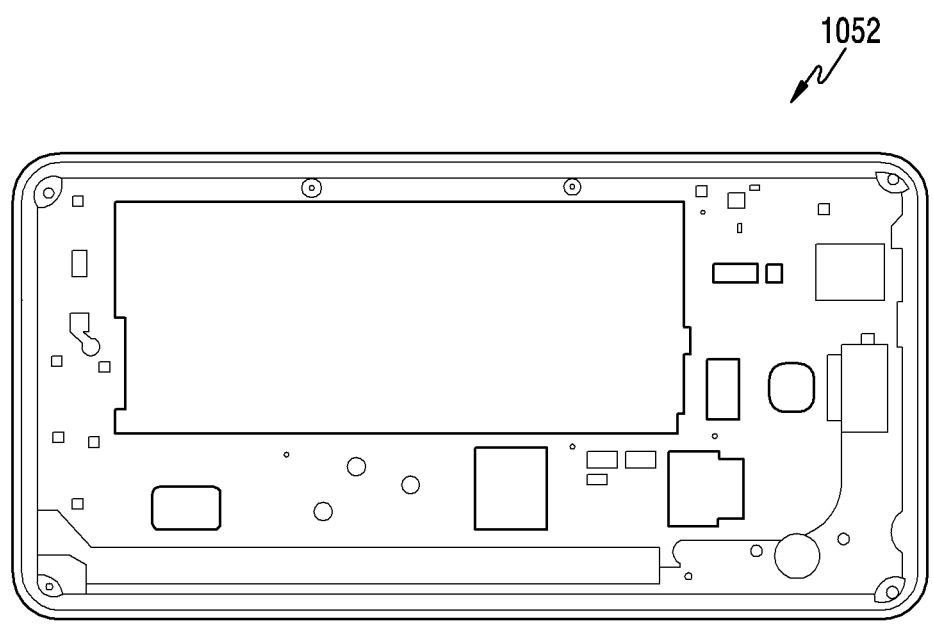

In action 907, an NC process may be performed. Unnecessary portions may be removed by the NC process, and an exterior for the housing may be finally formed. For example, a diecasting material 1052 as shown in FIG. 10E may be formed.

In action 909, an aluminum layer may be coated. The aluminum layer may be coated over the diecasting material through physical vapor deposition (PVD) plating. By coating the aluminum layer, at least part in at least one pore existing on the surface of the diecasting material may be filled with the aluminum layer.

Figure 10F:
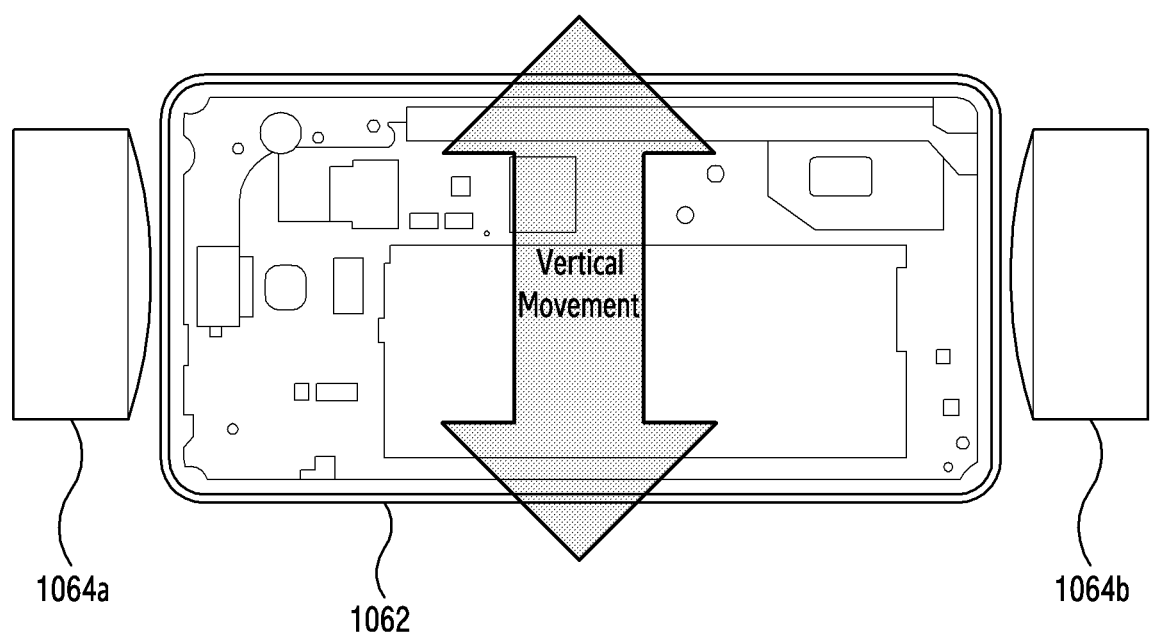

In action 911, polishing may be performed. By polishing, at least part of the aluminum layer coated in action 909 may be removed. For example, as shown in FIG. 10F, polishing may be performed by bringing a diecasting material 1062 coated with the aluminum layer into contact with tools for polishing (for example, sandpaper) 1064*a* and 1064*b* and moving vertically. By the polishing operation, a part of the diecasting material 1062 may further be removed in addition to a part of the aluminum layer.

In action 913, anodizing may be performed. For example, in order to prevent corrosion and to form an aesthetical appearance, soft anodizing may be performed. By actions 909 and 911, a part of the surface where anodizing is performed may be occupied by the metal alloy, and the remaining part may be occupied by the aluminum layer.

In action 915, am NC process may be performed. By action 913, an oxidation film may be formed on the entirety of the housing. A part of the housing may need to be exposed in a metal alloy state for the purpose of electrically connecting with other components or other purposes. In order to expose a part of the housing in the metal alloy state, the NC process for removing a part of the oxidation film may be performed. According to another embodiment, on behalf of the NC process, an action of removing the oxidation film by using lasers may be performed.

The housing of the structure as shown in FIG. 4 may be manufactured according to the processes described with reference to FIGS. 6 to 10F. In the process of cutting the aluminum layer and the aluminum alloy, a depth for cutting may be determined by considering a thickness of the coated aluminum layer (for example, the aluminum layer 740) and a thickness of a skin layer. For example, the depth for cutting may be larger than the thickness of the aluminum layer and may be smaller than a sum thickness of the aluminum layer and the skin layer.

According to an embodiment, the thickness of the skin layer may be identified by measurement. It is estimated that pores generated in housings manufactured through the same equipment have similar distributions and/or sizes. The thickness of the skin layer may be measured by cutting surfaces of a predetermined number of sampled housings and identifying positions of internal pores on uppermost ends.

According to another embodiment, the thickness of the skin layer may be identified through a non-destructive inspection. The non-destructive inspection may be included as part of the manufacturing process of the housing. For example, an aluminum layer removing process including a non-destructive inspection may include actions shown in FIG. 11.

Figure 11:
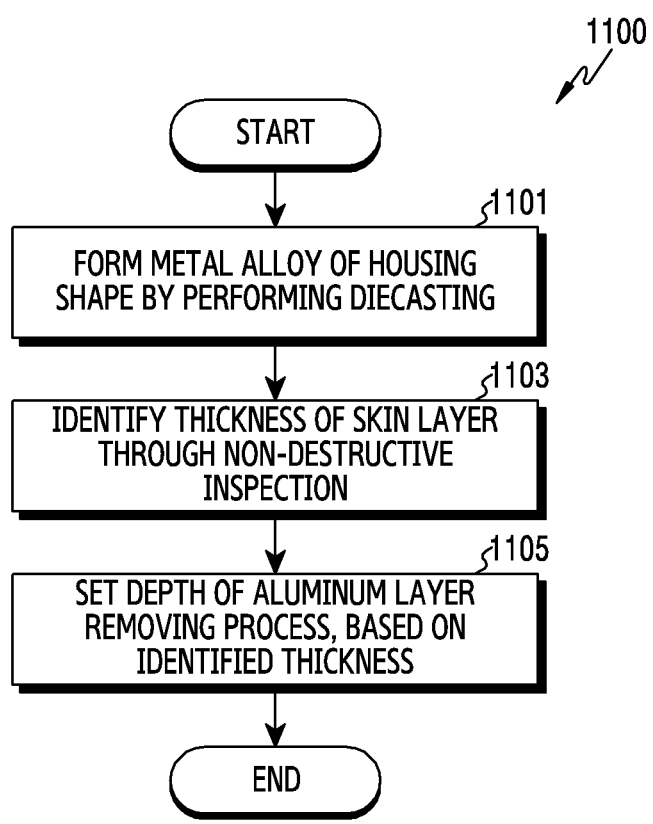
FIG. 11 is a flowchart for analyzing a skin layer of a housing according to an embodiment.

FIG. 11 is a flowchart 900 for analyzing a skin layer of a housing according to an embodiment. Actions illustrated in FIG. 11 are performed by automation equipment for manufacturing a housing, and the automation equipment may include various power devices, control devices, and/or motion devices.

Referring to FIG. 11, in action 1101, a metal alloy of a shape of a housing may be formed by performing diecasting. For example, the metal alloy having the shape of the housing may be formed by inserting a metal alloy in a melted liquid state into a mold and then cooling. In order to remove air which is introduced while the metal alloy in the liquid state is inserted to the maximum, a process for deflating (for example, releasing gas) may be performed in parallel. For example, by releasing gas during a casting process by using a vacuum device attached to a casting machine, gas introduced into a product may be reduced.

In action 1103, a thickness of a skin layer may be identified through a non-destructive inspection. According to an embodiment, the metal alloy of the housing shape formed by diecasting may be moved to a place for inspection, and a non-destructive inspection (for example, a scanning electron microscope (SEM) inspection, radiographic testing, or ultrasound) may be performed for distributions and/or sizes of pores included in the metal alloy. The non-destructive inspection may be performed on all diecasting materials, or may be performed on some of the sampled materials. For example, a number of materials fixed for each lot may be sampled. The materials sampled for the inspection may not be productized after the inspection or may be productized through a subsequent process. When a position of an internal pore on an uppermost end is identified through the non-destructive inspection, a distance to the internal pore on the uppermost end from a surface may be measured, and a thickness of a skin layer may be determined from the measured distance.

In action 1105, a depth in an aluminum layer removing process (for example, action 605 of FIG. 6) may be set based on the identified thickness. A cutting depth value of equipment for performing the aluminum layer removing process may be set to be less than or equal to the thickness of the skin layer which is identified through the non-destructive inspection of action 1103.

According to various embodiments of the disclosure, a method for manufacturing a housing (for example, the housing 110) for an electronic device (for example, the electronic device 100) may include: generating a metal alloy (for example, the metal alloy 410) of a housing shape by using diecasting; coating a metal layer over the metal alloy; cutting the metal layer and a part of the metal alloy; and forming an oxidation film by performing anodizing.

According to various embodiments of the disclosure, the metal alloy (for example, the metal alloy 410) may include an aluminum alloy having a silicon content of 1% to 20%.

According to various embodiments of the disclosure, coating the metal layer may include coating an aluminum layer by physical vapor deposition (PVD) or plating.

According to various embodiments of the disclosure, the part of the metal layer may be cut from a surface to an internal surface contacting an uppermost pore which is closest to the surface of the metal alloy among pores existing in the metal alloy, or to a surface between the internal surface and the surface.

According to various embodiments of the disclosure, the method may further include performing a non-destructive inspection on the metal alloy (for example, the metal alloy 410), and determining a depth of the cutting based on a result of the non-destructive inspection.

According to various embodiments, performing the non-destructive inspection on the metal alloy (for example, the metal alloy 410) may include: sampling some of metal alloys of a housing shape generated by the diecasting; and performing a non-destructive inspection on some of the metal alloys of the housing shape sampled.

Figure 12:
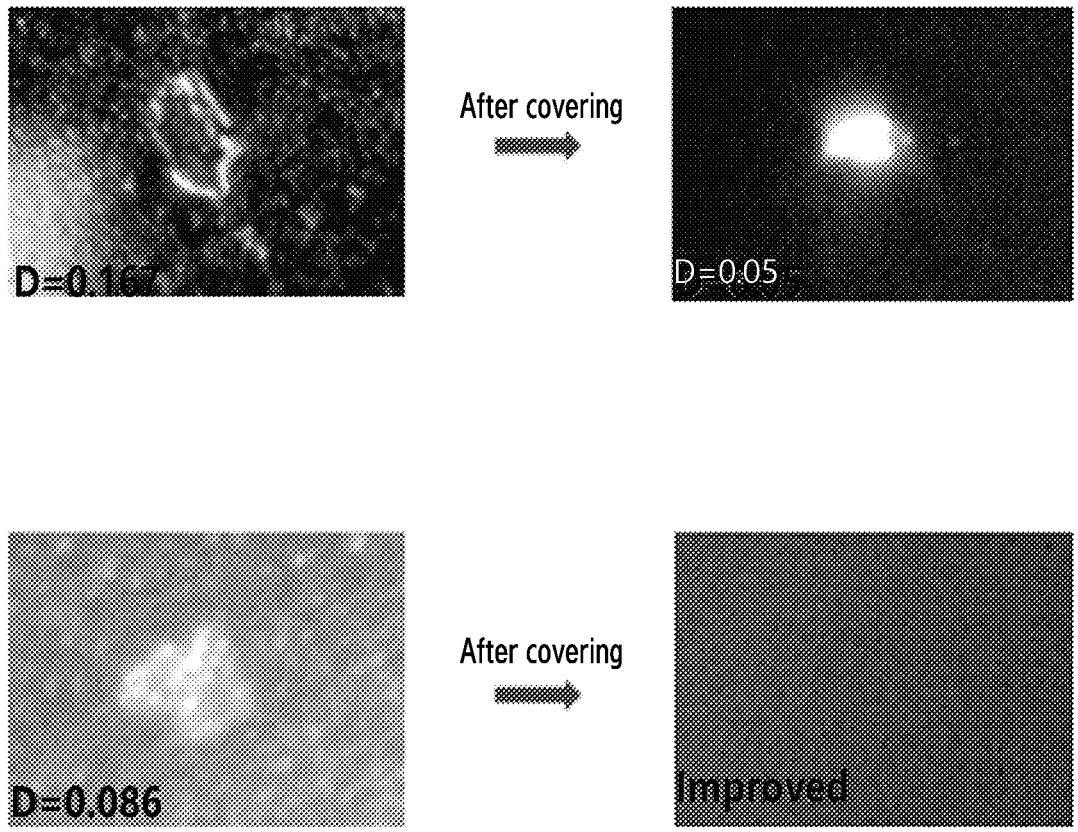
FIG. 12 is a view illustrating an example of a housing which has undergone a surface treatment according to an embodiment.

FIG. 12 is a view illustrating an example of a housing which has undergone a surface treatment according to an embodiment. FIG. 12 illustrates an effect of the surface treatment according to various embodiments of the disclosure. Referring to FIG. 12, the left drawing shows a state before the surface treatment and the right drawing shows a state after the surface treatment. As visually identified, sizes of pores observed from the exterior of the housing may be reduced or removed. For ex ample, it can be seen that a diameter of a pore is reduced from 0.167 mm to 0.05 mm or from 0.086 mm to the extent to which the pore is not seen through treatments according to an embodiment of the present disclosure.

The electronic device according to an embodiment of the disclosure may be one of various types of electronic devices. The electronic device may include, for example, a portable communication device (e.g., a smart phone), a computer device, a portable multimedia device, a portable medical device, a camera, a wearable device, or a home appliance. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic (EM) wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a housing comprising a first surface, a second surface, and a side surface surrounding a space between the first surface and the second surface; and
    a display disposed to form a front surface of the electronic device with the first surface of the housing,
    wherein at least one of the first surface, the second surface, or the side surface comprises:
        a metal alloy comprising at least one pore formed in a surface of the metal alloy;
        a metal member disposed in at least part of an inner space of the at least one pore; and
        an oxidation film disposed on the surface of the metal alloy and in contact with at least part of the metal alloy and the metal member.

2. The electronic device of claim 1,
    wherein the metal alloy comprises an aluminum alloy, and
    wherein a space in which the metal member is not disposed exists in the at least one pore.

3. The electronic device of claim 2, wherein the aluminum alloy comprises a silicon (Si) content of 1% to 20%.

4. The electronic device of claim 1, wherein the metal alloy is formed by diecasting.

5. The electronic device of claim 1, wherein the metal member comprises aluminum.

6. The electronic device of claim 1,
    wherein the metal member is formed in the at least one pore by coating a metal layer over the metal alloy and by removing a part of the metal layer which is not disposed in the at least one pore and a part of the metal alloy, and
    wherein the metal member corresponds to a part remaining after removing the part of the metal layer.

7. The electronic device of claim 1, wherein the oxidation film is formed by soft anodizing.

8. A housing of an electronic device, the housing comprising:
    a first surface;
    a second surface; and
    a side surface surrounding a space between the first surface and the second surface, wherein at least one of the first surface, the second surface, or the side surface comprises:
- a metal alloy comprising at least one pore formed in a surface of the metal alloy;
- a metal member disposed in at least part of an inner space of the at least one pore; and
- an oxidation film disposed on the surface of the metal alloy and in contact with at least part of the metal alloy and the metal member.

9. The housing of claim 8,
wherein the metal alloy comprises an aluminum alloy, and
wherein a space in which the metal member is not disposed exists in the at least one pore.

10. The housing of claim 9, wherein the aluminum alloy comprises a silicon (Si) content of 1% to 20%.

11. The housing of claim 8, wherein the metal alloy is formed by diecasting.

12. The housing of claim 8, wherein the metal member comprises aluminum.

13. The housing of claim 8,
wherein the metal member is formed in the at least one pore by coating a metal layer over of the metal alloy and by removing a part of the metal layer which is not disposed in the at least one pore and a part of the metal alloy, and
wherein the metal member corresponds to a part remaining after removing the part of the metal layer.

14. The housing of claim 8, wherein the oxidation film is formed by soft anodizing.

15. A method for manufacturing a housing for an electronic device, the method comprising:
generating a metal alloy having a shape corresponding to the housing by using diecasting, wherein the housing comprises a first surface, a second surface, and a side surface surrounding a space between the first surface and the second surface;
coating a metal layer over the metal alloy;
cutting a part of the metal layer and a part of the metal alloy; and
forming an oxidation film by anodizing,
wherein the metal alloy, which is cut, comprises at least one pore formed in a surface of the metal alloy,
wherein a metal member corresponding to a part remaining after cutting the part of the metal layer is disposed in at least part of an inner space of the at least one pore, and
wherein the oxidation film is disposed on the surface of the metal alloy and in contact with at least part of the metal alloy and the metal member.

16. The method of claim 15, wherein the metal alloy comprises an aluminum alloy comprising a silicon content of 1% to 20%.

17. The method of claim 15, wherein the coating of the metal layer comprises:
coating an aluminum layer by physical vapor deposition (PVD) or plating.

18. The method of claim 15, wherein the part of the metal layer is cut from an upper surface to a lower surface contacting the at least one pore.

19. The method of claim 15, wherein a depth of the part of the metal layer is based on a thickness of the metal layer and a thickness of a skin layer of the metal alloy which does not include an internal pore.

20. The method of claim 19, wherein the metal alloy comprises an aluminum alloy.

* * * * *